US009858113B2

(12) United States Patent
Asaoka et al.

(10) Patent No.: US 9,858,113 B2
(45) Date of Patent: Jan. 2, 2018

(54) CREATING EXECUTION FLOW BY ASSOCIATING EXECUTION COMPONENT INFORMATION WITH TASK NAME

(71) Applicant: FUJITSU LIMITED, Kawasaki-shi, Kanagawa (JP)

(72) Inventors: Masahiro Asaoka, Kawasaki (JP); Kazuo Tomoda, Shinagawa (JP)

(73) Assignee: FUJITSU LIMITED, Kawasaki (JP)

( * ) Notice: Subject to any disclaimer, the term of this patent is extended or adjusted under 35 U.S.C. 154(b) by 64 days.

(21) Appl. No.: 14/825,735

(22) Filed: Aug. 13, 2015

(65) Prior Publication Data

US 2015/0347182 A1 Dec. 3, 2015

Related U.S. Application Data

(63) Continuation of application No. PCT/JP2013/056023, filed on Mar. 5, 2013.

(51) Int. Cl.
*G06F 9/48* (2006.01)
*G06F 9/445* (2006.01)
(Continued)

(52) U.S. Cl.
CPC .............. *G06F 9/4843* (2013.01); *G06F 8/10* (2013.01); *G06F 8/433* (2013.01); *G06F 9/445* (2013.01)

(58) Field of Classification Search
CPC ........ G06F 9/4843; G06F 8/433; G06F 9/445; G06F 8/18; G06F 8/10
See application file for complete search history.

(56) References Cited

U.S. PATENT DOCUMENTS

2003/0050800 A1* 3/2003 Brandt ...................... G06F 8/34 705/2
2005/0149868 A1 7/2005 Katayama et al.
(Continued)

FOREIGN PATENT DOCUMENTS

JP 04-107628 4/1992
JP 07-146785 6/1995
(Continued)

OTHER PUBLICATIONS

International Search Report dated May 21, 2013 in corresponding international application PCT/JP2013/056023.

*Primary Examiner* — Benjamin Wu
(74) *Attorney, Agent, or Firm* — Staas & Halsey LLP

(57) ABSTRACT

An execution-flow-creation aiding apparatus obtains a written operation procedure that represents an operation procedure of a series of tasks involved in operation work. The execution-flow-creation aiding apparatus refers to component information and based on a result of comparing the task name of a task included among the series of tasks involved in operation work and the component name of a component, associates the task and the component. The execution-flow-creation aiding apparatus selects among the series of tasks, a second task that is not associated with a component and that is immediately before or after a first task associated with a given component. The execution-flow-creation aiding apparatus refers to the component information and based on a result of comparing the task name of the selected second task and the variable name of a variable provided when the given component is executed, associates the second task with the given component.

16 Claims, 13 Drawing Sheets

(51) Int. Cl.
*G06F 9/45* (2006.01)
*G06F 9/44* (2006.01)

(56) References Cited

U.S. PATENT DOCUMENTS

| | | | | |
|---|---|---|---|---|
| 2010/0011369 | A1* | 1/2010 | Uchida | G06F 9/5038 718/104 |
| 2012/0035975 | A1* | 2/2012 | Sugimoto | G06Q 10/06 705/7.26 |
| 2013/0080834 | A1* | 3/2013 | Sakai | G06F 11/3696 714/32 |
| 2015/0120376 | A1* | 4/2015 | Inagaki | G06F 9/48 705/7.26 |
| 2015/0163092 | A1* | 6/2015 | Takagi | G06F 9/5077 709/224 |
| 2017/0053117 | A1* | 2/2017 | Mori | G06F 21/554 |

FOREIGN PATENT DOCUMENTS

| | | |
|---|---|---|
| JP | 08-289050 | 11/1996 |
| JP | 2000-047859 | 2/2000 |
| JP | 2001-166928 | 6/2001 |
| JP | 2005-196291 | 7/2005 |
| JP | 2008-242613 | 10/2008 |
| JP | 2012-252684 | 12/2012 |

* cited by examiner

110
WRITTEN OPERATION PROCEDURE
(1)
101
EXECUTION-FLOW-CREATION AIDING APPARATUS
120
COMPONENT INFORMATION
COMPONENT P1
COMPONENT P2
COMPONENT P3
VARIABLE a
VARIABLE b
VARIABLE c
(2)
(4)
(2)
(2)
TASK OP1
TASK OP2
TASK OP3
TASK OP4
TASK OP5
(3)

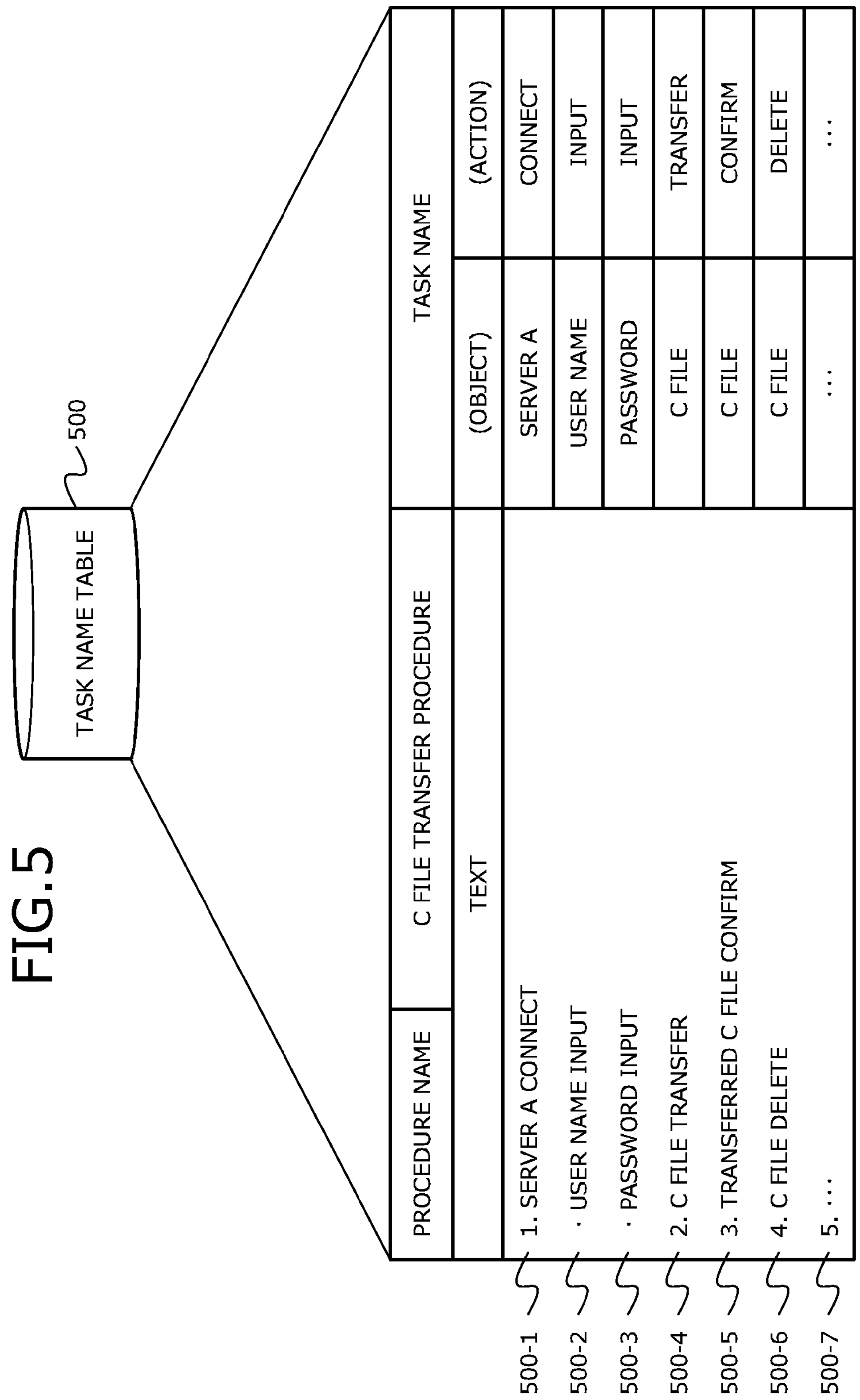
| PROCEDURE NAME | C FILE TRANSFER PROCEDURE | |
|---|---|---|
| TEXT | TASK NAME | |
| | (OBJECT) | (ACTION) |
| 1. SERVER A CONNECT | SERVER A | CONNECT |
| · USER NAME INPUT | USER NAME | INPUT |
| · PASSWORD INPUT | PASSWORD | INPUT |
| 2. C FILE TRANSFER | C FILE | TRANSFER |
| 3. TRANSFERRED C FILE CONFIRM | C FILE | CONFIRM |
| 4. C FILE DELETE | C FILE | DELETE |
| 5. … | … | … |

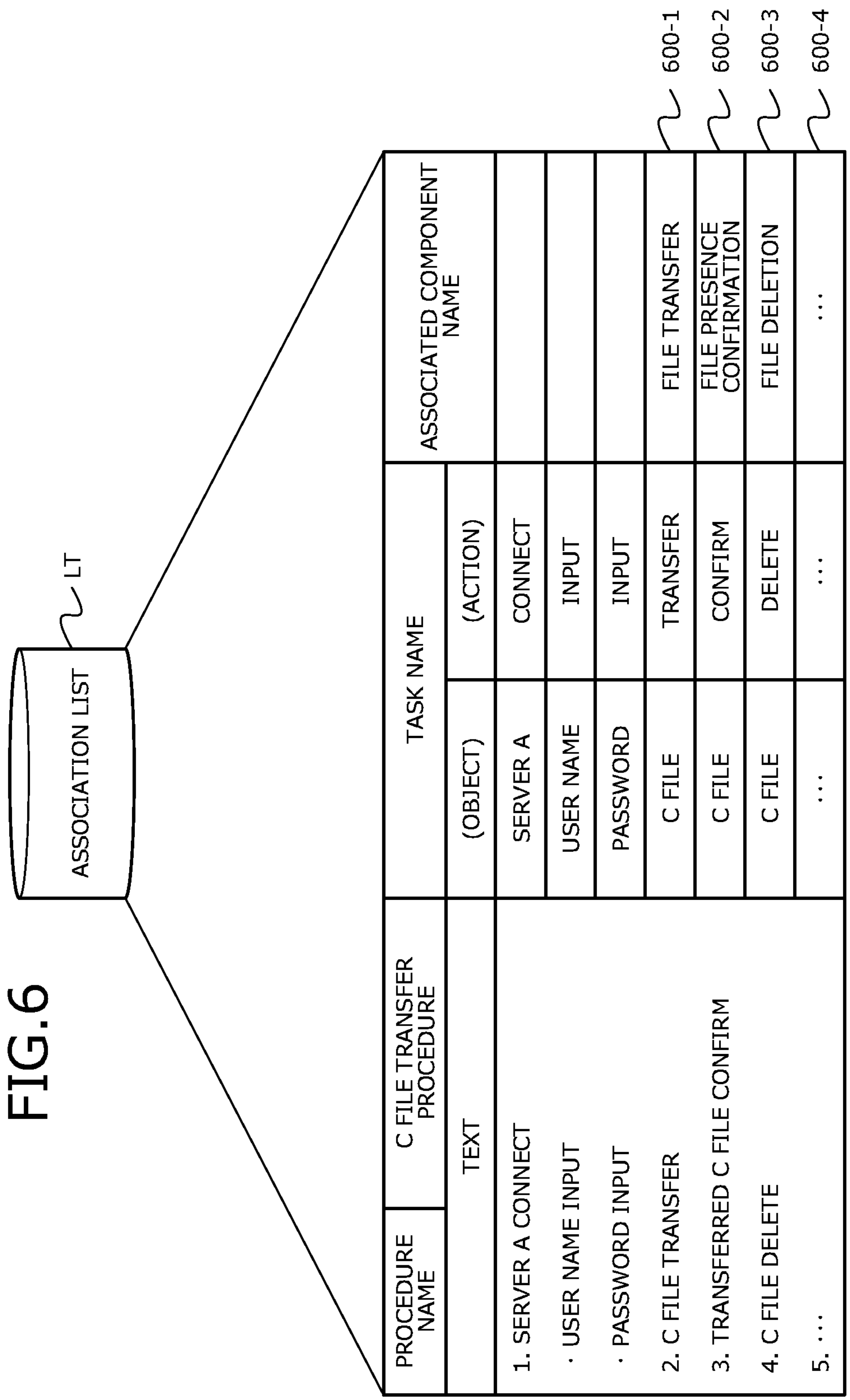
FIG.6
ASSOCIATION LIST
LT
PROCEDURE NAME
C FILE TRANSFER PROCEDURE
TEXT
TASK NAME
(OBJECT)
(ACTION)
ASSOCIATED COMPONENT NAME
1. SERVER A CONNECT
SERVER A
CONNECT
· USER NAME INPUT
USER NAME
INPUT
· PASSWORD INPUT
PASSWORD
INPUT
2. C FILE TRANSFER
C FILE
TRANSFER
FILE TRANSFER
3. TRANSFERRED C FILE CONFIRM
C FILE
CONFIRM
FILE PRESENCE CONFIRMATION
4. C FILE DELETE
C FILE
DELETE
FILE DELETION
5. …
…
…
…
600-1
600-2
600-3
600-4

101
WRITTEN OPERATION PROCEDURE
M
OBTAINING UNIT
701
EXTRACTING UNIT
702
FIRST ASSOCIATING UNIT
703
SELECTING UNIT
704
SECOND ASSOCIATING UNIT
705
OUTPUT UNIT
706
TASK NAME TABLE
500
ASSOCIATION LIST
LT
AUTOMATED EXECUTION COMPONENT DB
400

| PROCEDURE NAME | C FILE TRANSFER PROCEDURE | TASK NAME | | ASSOCIATED COMPONENT NAME |
|---|---|---|---|---|
| TEXT | | (OBJECT) | (ACTION) | |
| 1. SERVER A CONNECT | | SERVER A | CONNECT | |
| · USER NAME INPUT | | USER NAME | INPUT | |
| · PASSWORD INPUT | | PASSWORD | INPUT | |
| 2. C FILE TRANSFER | | C FILE | TRANSFER | FILE TRANSFER (600-1) |
| 3. TRANSFERRED C FILE CONFIRM | | C FILE | CONFIRM | FILE PRESENCE CONFIRMATION (600-2) |
| 4. C FILE DELETE | | C FILE | DELETE | FILE DELETION (600-3) |
| 5. ··· | | ··· | ··· | ··· (600-4) |

(8B)

LT

| PROCEDURE NAME | C FILE TRANSFER PROCEDURE | TASK NAME | | ASSOCIATED COMPONENT NAME |
|---|---|---|---|---|
| TEXT | | (OBJECT) | (ACTION) | |
| 1. SERVER A CONNECT | | SERVER A | CONNECT | |
| · USER NAME INPUT | | USER NAME | INPUT | |
| · PASSWORD INPUT | | PASSWORD | INPUT | FILE TRANSFER (600-1) |
| 2. C FILE TRANSFER | | C FILE | TRANSFER | |
| 3. TRANSFERRED C FILE CONFIRM | | C FILE | CONFIRM | FILE PRESENCE CONFIRMATION (600-2) |
| 4. C FILE DELETE | | C FILE | DELETE | FILE DELETION (600-3) |
| 5. ··· | | ··· | ··· | ··· (600-4) |

| PROCEDURE NAME | C FILE TRANSFER PROCEDURE | TASK NAME | | ASSOCIATED COMPONENT NAME | |
|---|---|---|---|---|---|
| TEXT | | (OBJECT) | (ACTION) | | |
| 1. SERVER A CONNECT | | SERVER A | CONNECT | | |
| · USER NAME INPUT | | USER NAME | INPUT | FILE TRANSFER | 600-1 |
| · PASSWORD INPUT | | PASSWORD | INPUT | | |
| 2. C FILE TRANSFER | | C FILE | TRANSFER | | |
| 3. TRANSFERRED C FILE CONFIRM | | C FILE | CONFIRM | FILE PRESENCE CONFIRMATION | 600-2 |
| 4. C FILE DELETE | | C FILE | DELETE | FILE DELETION | 600-3 |
| 5. ··· | | ··· | ··· | ··· | 600-4 |

(8D) LT

| PROCEDURE NAME | C FILE TRANSFER PROCEDURE | TASK NAME | | ASSOCIATED COMPONENT NAME | |
|---|---|---|---|---|---|
| TEXT | | (OBJECT) | (ACTION) | | |
| 1. SERVER A CONNECT | | SERVER A | CONNECT | FILE TRANSFER | 600-1 |
| · USER NAME INPUT | | USER NAME | INPUT | | |
| · PASSWORD INPUT | | PASSWORD | INPUT | | |
| 2. C FILE TRANSFER | | C FILE | TRANSFER | | |
| 3. TRANSFERRED C FILE CONFIRM | | C FILE | CONFIRM | FILE PRESENCE CONFIRMATION | 600-2 |
| 4. C FILE DELETE | | C FILE | DELETE | FILE DELETION | 600-3 |
| 5. ··· | | ··· | ··· | ··· | 600-4 |

START
NO
HAS WRITTEN OPERATION PROCEDURE M BEEN OBTAINED?
S1001
YES
EXTRACT TASK NAME
S1002
EXECUTE FIRST ASSOCIATION PROCESS
S1003
EXECUTE SECOND ASSOCIATION PROCESS
S1004
OUTPUT ASSOCIATION LIST LT
S1005
END

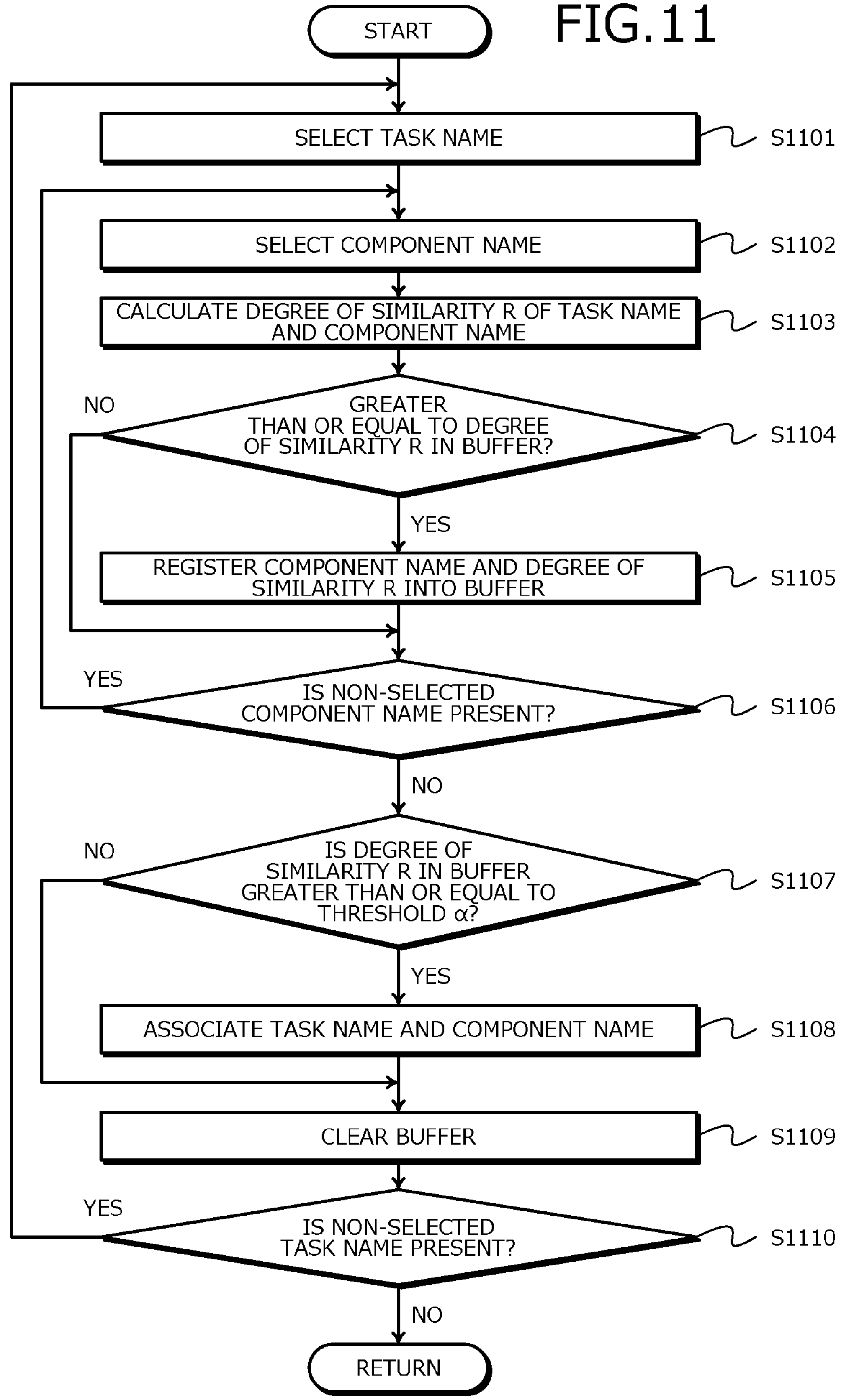
FIG.11
START
SELECT TASK NAME
S1101
SELECT COMPONENT NAME
S1102
CALCULATE DEGREE OF SIMILARITY R OF TASK NAME AND COMPONENT NAME
S1103
GREATER THAN OR EQUAL TO DEGREE OF SIMILARITY R IN BUFFER?
S1104
NO
YES
REGISTER COMPONENT NAME AND DEGREE OF SIMILARITY R INTO BUFFER
S1105
IS NON-SELECTED COMPONENT NAME PRESENT?
S1106
YES
NO
IS DEGREE OF SIMILARITY R IN BUFFER GREATER THAN OR EQUAL TO THRESHOLD α?
S1107
NO
YES
ASSOCIATE TASK NAME AND COMPONENT NAME
S1108
CLEAR BUFFER
S1109
IS NON-SELECTED TASK NAME PRESENT?
S1110
YES
NO
RETURN

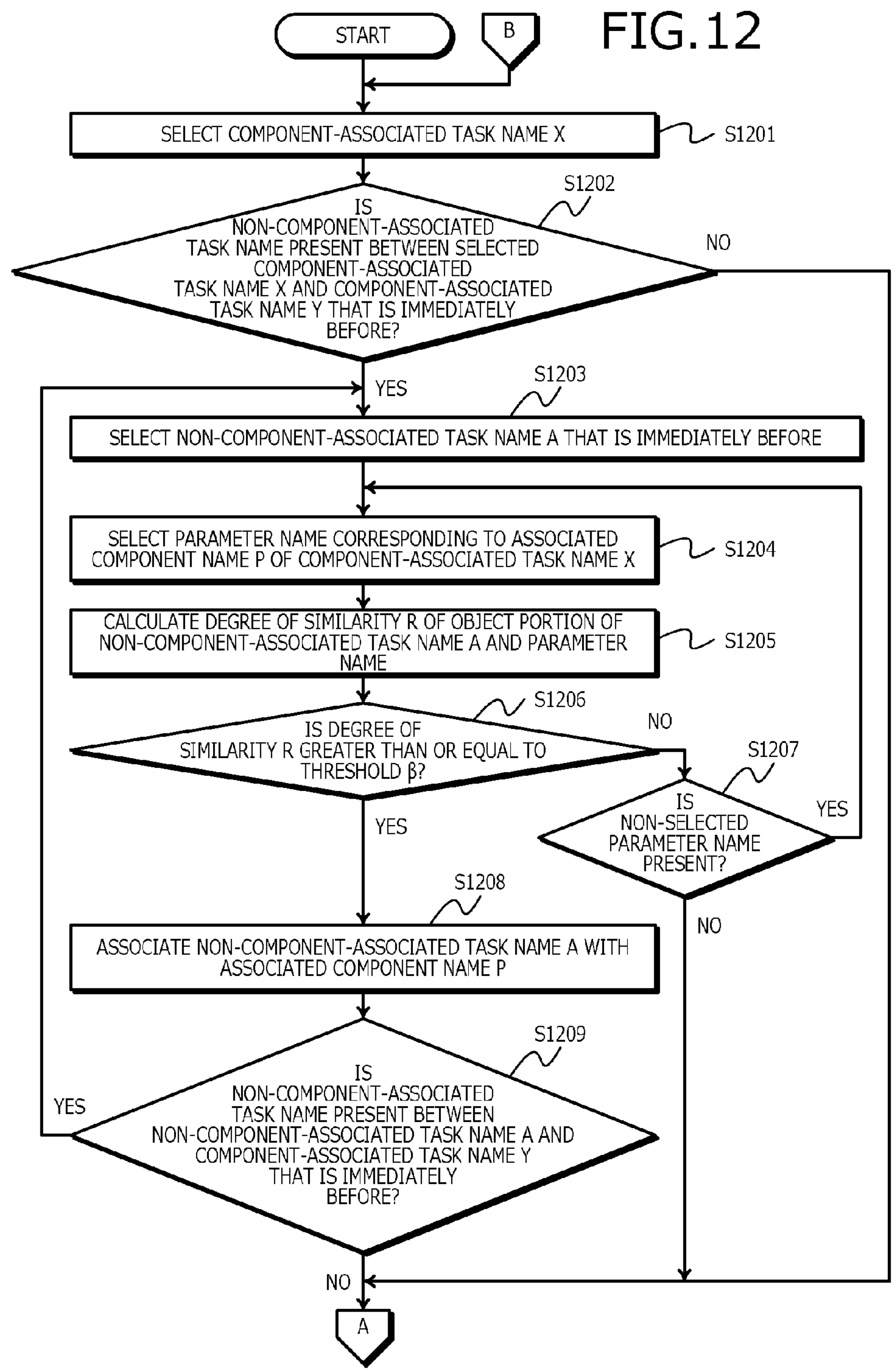

FIG.12
START
B
SELECT COMPONENT-ASSOCIATED TASK NAME X
S1201
S1202
IS NON-COMPONENT-ASSOCIATED TASK NAME PRESENT BETWEEN SELECTED COMPONENT-ASSOCIATED TASK NAME X AND COMPONENT-ASSOCIATED TASK NAME Y THAT IS IMMEDIATELY BEFORE?
NO
YES
S1203
SELECT NON-COMPONENT-ASSOCIATED TASK NAME A THAT IS IMMEDIATELY BEFORE
SELECT PARAMETER NAME CORRESPONDING TO ASSOCIATED COMPONENT NAME P OF COMPONENT-ASSOCIATED TASK NAME X
S1204
CALCULATE DEGREE OF SIMILARITY R OF OBJECT PORTION OF NON-COMPONENT-ASSOCIATED TASK NAME A AND PARAMETER NAME
S1205
S1206
IS DEGREE OF SIMILARITY R GREATER THAN OR EQUAL TO THRESHOLD β?
NO
S1207
IS NON-SELECTED PARAMETER NAME PRESENT?
YES
YES
NO
S1208
ASSOCIATE NON-COMPONENT-ASSOCIATED TASK NAME A WITH ASSOCIATED COMPONENT NAME P
S1209
IS NON-COMPONENT-ASSOCIATED TASK NAME PRESENT BETWEEN NON-COMPONENT-ASSOCIATED TASK NAME A AND COMPONENT-ASSOCIATED TASK NAME Y THAT IS IMMEDIATELY BEFORE?
YES
NO
A

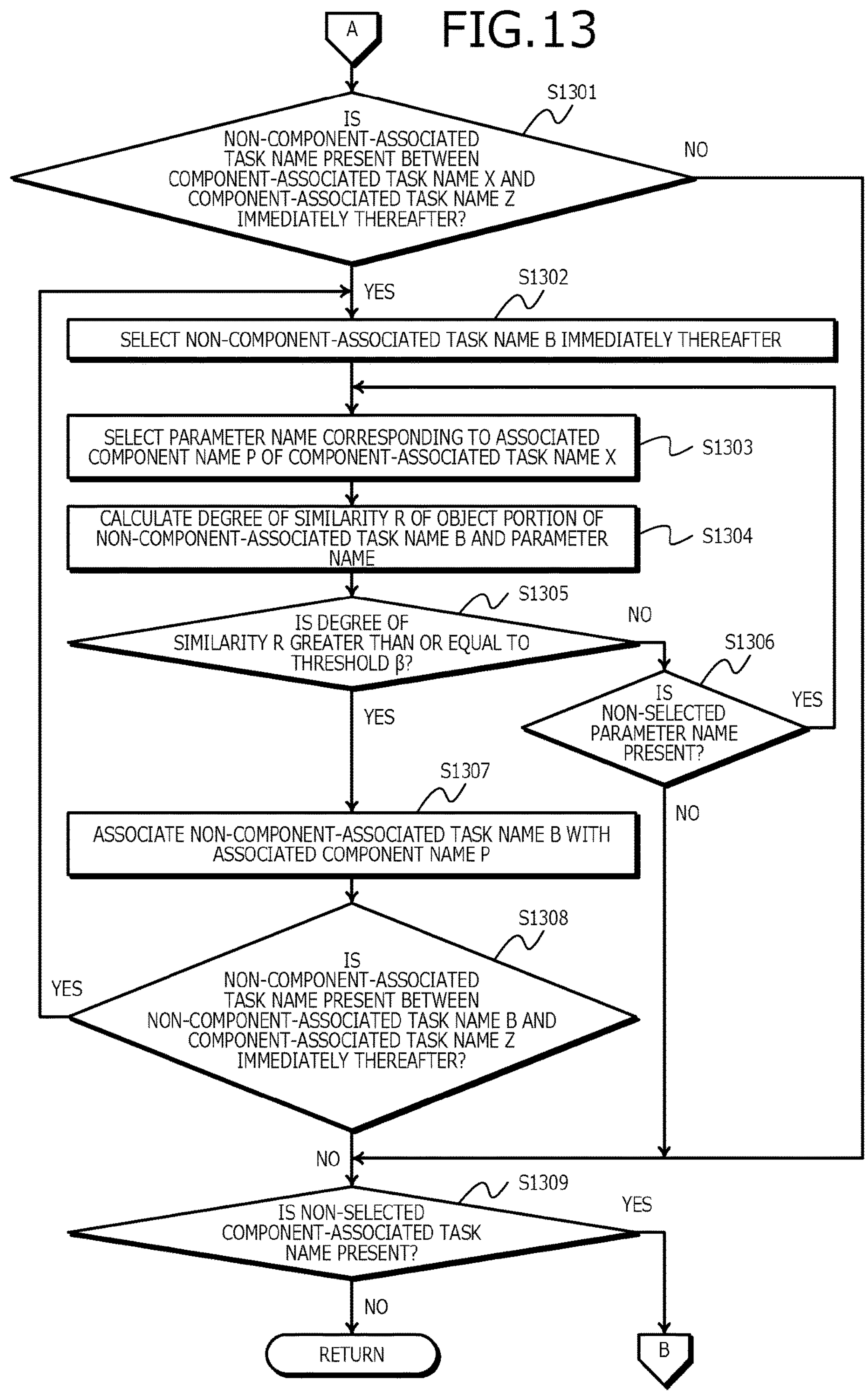
FIG.13
A
S1301
IS NON-COMPONENT-ASSOCIATED TASK NAME PRESENT BETWEEN COMPONENT-ASSOCIATED TASK NAME X AND COMPONENT-ASSOCIATED TASK NAME Z IMMEDIATELY THEREAFTER?
NO
YES
S1302
SELECT NON-COMPONENT-ASSOCIATED TASK NAME B IMMEDIATELY THEREAFTER
SELECT PARAMETER NAME CORRESPONDING TO ASSOCIATED COMPONENT NAME P OF COMPONENT-ASSOCIATED TASK NAME X
S1303
CALCULATE DEGREE OF SIMILARITY R OF OBJECT PORTION OF NON-COMPONENT-ASSOCIATED TASK NAME B AND PARAMETER NAME
S1304
S1305
IS DEGREE OF SIMILARITY R GREATER THAN OR EQUAL TO THRESHOLD β?
NO
S1306
IS NON-SELECTED PARAMETER NAME PRESENT?
YES
YES
NO
S1307
ASSOCIATE NON-COMPONENT-ASSOCIATED TASK NAME B WITH ASSOCIATED COMPONENT NAME P
S1308
IS NON-COMPONENT-ASSOCIATED TASK NAME PRESENT BETWEEN NON-COMPONENT-ASSOCIATED TASK NAME B AND COMPONENT-ASSOCIATED TASK NAME Z IMMEDIATELY THEREAFTER?
YES
NO
S1309
IS NON-SELECTED COMPONENT-ASSOCIATED TASK NAME PRESENT?
YES
NO
RETURN
B

CREATING EXECUTION FLOW BY ASSOCIATING EXECUTION COMPONENT INFORMATION WITH TASK NAME

CROSS REFERENCE TO RELATED APPLICATIONS

This application is a continuation application of International Application PCT/JP2013/056023, filed on Mar. 5, 2013 and designating the U.S., the entire contents of which are incorporated herein by reference.

FIELD

The embodiments discussed herein are related to a computer product, an execution-flow-creation aiding apparatus, and an execution-flow-creation aiding method.

BACKGROUND

In recent years, to improve the quality of system operation work and reduce the number of operator man-hours, operation work has become automated by automation tools. Further, there is demand for execution flows, which indicate execution sequences for automated execution components, to be created from a written operation procedure describing manual tasks performed by an operator, and for automated execution by automation tools.

For example, according to a related technique, a written operation procedure indicating data of an operation procedure that corresponds to an input instruction is analyzed and an operation procedure corresponding to the instruction is automatically executed. Further, according to another technique, design specified data corresponding to a screen transition diagram of a format in which screens and processes are described is interpreted and a user interface application program is generated. For examples, refer to Japanese Examined Patent Application Publication Nos. H8-289050, H7-146785, and 2005-196291.

Nonetheless, with the conventional techniques, when operator tasks in the written operation procedure are converted into automated execution components of the automation tool and an execution flow is created, associating the operator tasks and the automated execution components of the automation tool is difficult. For example, when task names and component names are compared to associate tasks and automated execution components, associations of many-to-one in the written operation procedure are not possible, such as executing by a single automated execution component, work that requires multiple tasks.

SUMMARY

According to an aspect of an embodiment, a non-transitory, computer-readable recording medium stores therein an execution-flow-creation aiding program that causes a computer to execute a process that includes referring to component information that for each component that executes a portion of or all of a series of tasks involved in operation work, indicates associations of a component name of the component and a variable name of a variable provided when the component is executed, and based on a result of comparing a task name of a task included among the series of tasks and the component name of the component, associating the task and the component; selecting among the series of tasks, a second task that is not associated with a component and that is immediately before or after a first task that is associated with a given component; and referring to the component information and based on a result of comparing a task name of the selected second task and a variable name of a variable provided when the given component is executed, associating the second task with the given component.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram depicting an example of the contents of a task name table 500;

FIG. 6 is a diagram depicting an example of the contents of an association list LT;

FIGS. 8 and 9 are diagrams depicting a transition example of the contents of the association list LT;

FIG. 11 is a flowchart of an example of a detailed procedure of a first association process; and FIGS. 12 and 13 are flowcharts depicting an example of a detailed procedure of a second association process.

DESCRIPTION OF EMBODIMENTS

Embodiments of an execution-flow-creation aiding program, an execution-flow-creation aiding apparatus, and an execution-flow-creation aiding method will be described in detail with reference to the accompanying drawings.

Figure 1:
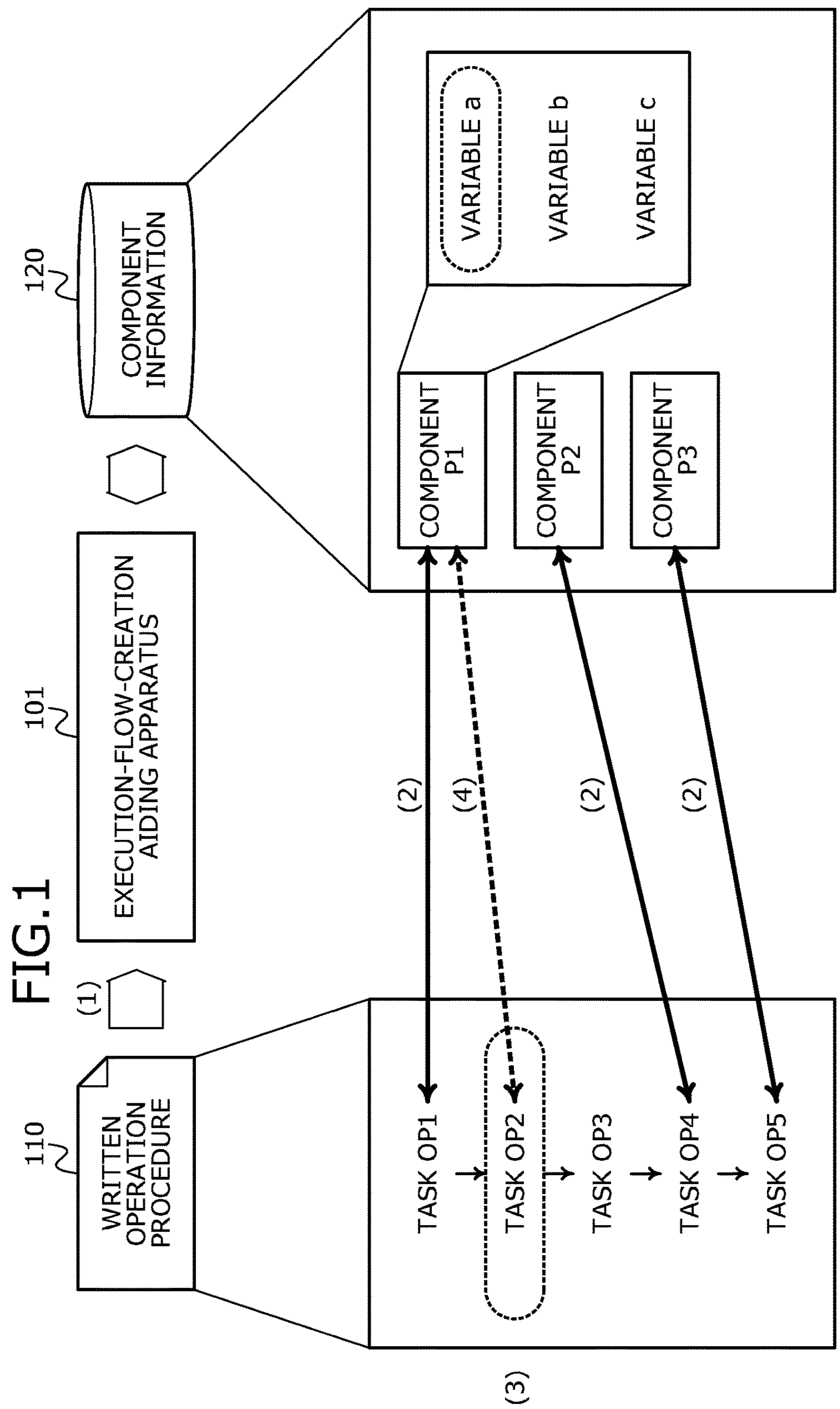
FIG. 1 is a diagram depicting an example of an execution-flow-creation aiding method according to an embodiment.

FIG. 1 is a diagram depicting an example of the execution-flow-creation aiding method according to an embodiment. In FIG. 1, the execution-flow-creation aiding apparatus 101 is a computer that supports the work of creating from a written operation procedure, an execution flow that automates operation work.

Here, a written operation procedure is information representing an operation procedure of a series of tasks involved in operation work. More specifically, for example, a written operation procedure is text data describing in natural language, an operation procedure of a series of tasks involved in operation work. A task is a task performed by an operator. Examples of tasks include connecting to a server, inputting a user name, password, etc.

Operation work is work involved in system operation such as the operation and maintenance of the system and troubleshooting. An execution flow represents an execution sequence of components when operation work is executed automatically by software called an automation tool. A component is an automated execution component for automatically executing a portion of or all operator tasks involved in operation work. More specifically, for example, a component is a program that is called by the automation tool and that includes description of a mathematical function or a value given to a mathematical function for executing a function equivalent to a task performed by the operator.

In the present embodiment, to associate tasks and components, the execution-flow-creation aiding apparatus 101 not only determines correspondence between task names of tasks in a written operation procedure and component names of components of an automation tool, but also determines correspondence between task names and variable names of variables provided when a component is executed. As a result, tasks such as inputting and setting values of variables when a component is executed can be associated with the component and even in cases where plural tasks are executed by a single component, task/component associations are made. Hereinafter, an example of an execution-flow-creation aiding process of the execution-flow-creation aiding apparatus 101 will be described.

(1) The execution-flow-creation aiding apparatus 101 obtains a written operation procedure 110 that represents an operation procedure of a series of tasks involved in operation work. In the example depicted in FIG. 1, a series of tasks OP1 to OP5 involved in operation work are described in the written operation procedure 110.

(2) The execution-flow-creation aiding apparatus 101 refers to component information 120 and associates tasks and components based on a result of comparing task names of tasks included in a series of tasks involved in operation work and component names of components. Here, the component information 120 is information that associates and indicates for each component that executes a portion of or all of the tasks involved in the operation work, a component name of the component and a variable name of a variable to be provided when the component is executed. A variable, for example, is a server name, user name, password, file name, etc. that is input or set when a component is executed.

In the example depicted in FIG. 1, the component information 120 includes components P1 to P3. The component information 120 further includes variables a, b, and c, which are provided when component P1 is executed. For example, when component P1 is a component that automatically executes “file transfer”, variables a, b, and c are, for example, “transfer destination server name”, “user name”, “transferred file name”, etc. Although not depicted in the drawing, the component information 120 further includes variables provided when components P2 and P3 are executed.

More specifically, for example, the execution-flow-creation aiding apparatus 101 associates with a task, a component for which the degree of similarity of the component name thereof and the task name of the task is greater than or equal to a threshold and for which this degree of similarity is greatest among components P1 to P3 included in the component information 120. In the example depicted in FIG. 1, task OP1 and component P1 are associated, task OP4 and component P2 are associated, and task OP5 and component P3 are associated.

(3) The execution-flow-creation aiding apparatus 101 selects among the series of tasks, a second task that is not associated with a component and that is immediately before or after a first task that is associated with a component. In the example depicted in FIG. 1, among the series of tasks OP1 to OP5, task OP2 is selected, which is not associated with a component and is the task immediately after task OP1, which is associated with component P1.

(4) The execution-flow-creation aiding apparatus 101 refers to the component information 120 and associates the second task with a given component, based on a result of comparing the task name of the selected second task and the variable name of a variable given when the given component is executed. Here, when the task name of the task and the variable name of a variable provided when the component is executed are similar, the task has a high possibility of being a task of inputting or setting the value of the variable or a task that regards the value of the variable as an argument.

Therefore, for example, when the degree of similarity of the task name of task OP2 and the variable name of a variable provided when component P1 is executed is greater than or equal to a threshold, the execution-flow-creation aiding apparatus 101 associates task OP2 with component P1. As a result, a task of inputting or setting the value of a variable provided when a given component is executed or a task that regards the value of the variable as an argument can be associated with the given component.

In this example, the degree of similarity of the task name of task OP2 and the variable name of a variable a provided when component P1 is executed is assumed to be greater than or equal to a threshold. In this case, the execution-flow-creation aiding apparatus 101 associates task OP2 with component P1. Thereafter, the execution-flow-creation aiding apparatus 101, for example, recursively performs the operations at (3) and (4) until no task that is not associated with a component and that has yet to be selected remains among the series of tasks.

In the example depicted in FIG. 1, as a result of associating task OP2 with component P1, at (3), among the series of tasks OP1 to OP5, task OP3 is selected, which is not associated with a component and is the task immediately after task OP2, which is associated with component P1. At (4), if the degree of similarity of the task name of task OP3 and the variable name of a variable provided when component P1 is executed is greater than or equal to a threshold, task OP3 is associated with component P1.

In this manner, according to the execution-flow-creation aiding apparatus 101, task/component associations can be made even when operator tasks in the written operation procedure 110 and components of the automation tool are associated in many-to-one associations. As result, the work load can be reduced when execution flow automating operation work is created from the written operation procedure 110.

Figure 2:
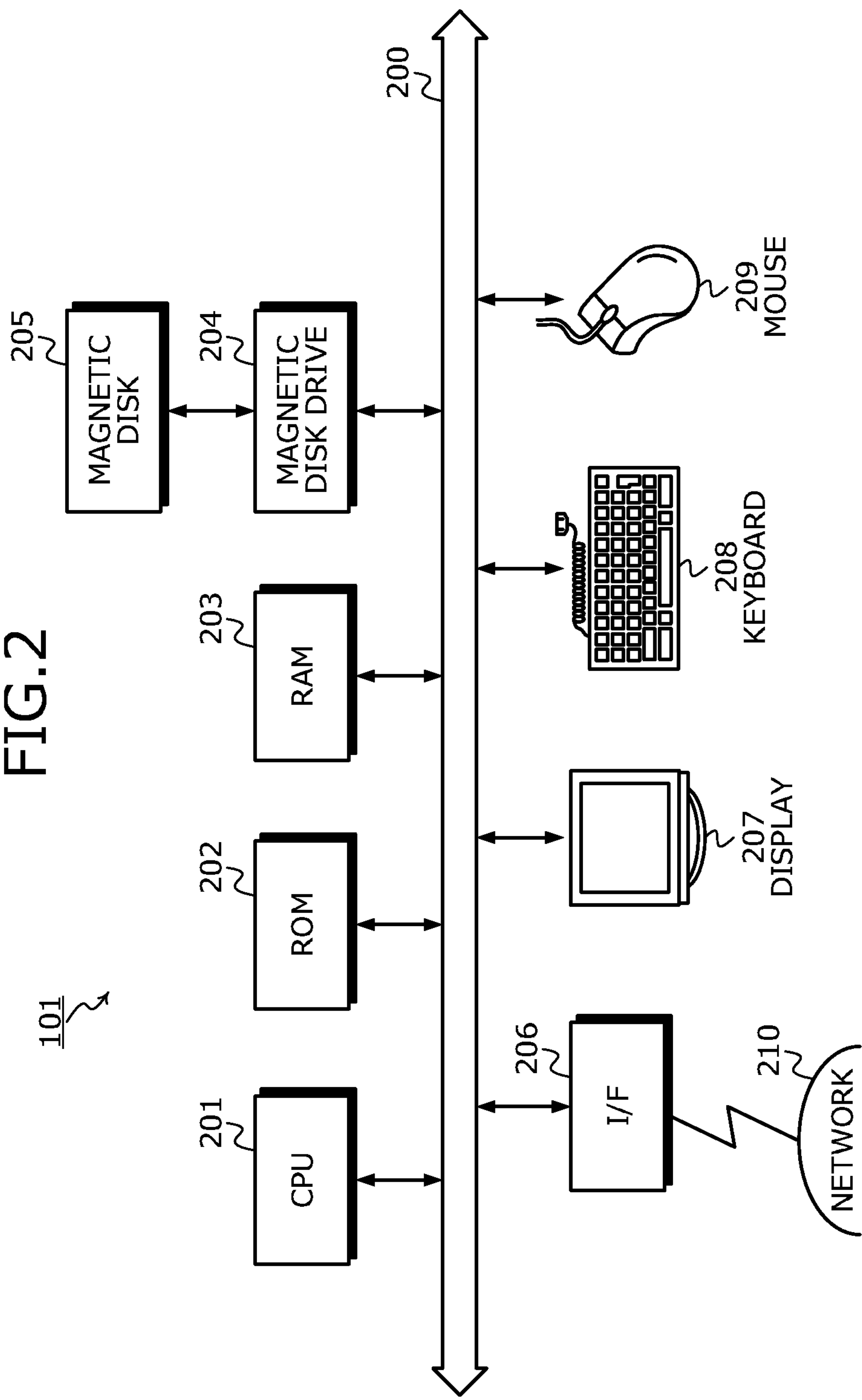
FIG. 2 is a block diagram of an example of hardware configuration of an execution-flow-creation aiding apparatus 101.

FIG. 2 is a block diagram of an example of hardware configuration of the execution-flow-creation aiding apparatus 101. In FIG. 2, the execution-flow-creation aiding apparatus 101 includes a central processing unit (CPU) 201, read-only memory (ROM) 202, random access memory (RAM 203), a magnetic disk drive 204, a magnetic disk 205, an interface (I/F) 206, a display 207, a keyboard 208, and a mouse 209, respectively connected by a bus 200.

Here, the CPU 201 governs overall control of the execution-flow-creation aiding apparatus 101. The ROM 202 stores programs such as a boot program. The RAM 203 is used as a work area of the CPU 201. The magnetic disk drive 204, under the control of the CPU 201, controls the reading and writing of data with respect to the magnetic disk 205. The magnetic disk 205 stores data written thereto under the control of the magnetic disk drive 204.

The I/F 206 is connected, via a communications line, to a network 210 such as a local area network (LAN), a wide area network (WAN), and the Internet and is connected to other apparatuses via the network 210. The I/F 206 administers an internal interface with the network 210 and controls the input and output of data from external apparatuses. A modem, LAN adapter, and the like may be employed as the I/F 206.

The display 207 displays data such as documents, images, and function information in addition to a cursor, icons and toolboxes. A CRT, a TFT liquid crystal display, a plasma display, and the like may be employed as the display 207.

The keyboard 208 has keys for inputting text, numerals, various instructions, etc. and inputs data. The keyboard 208 may further be a touch panel type input pad, a numeric keypad, and the like. The mouse 209 moves the cursor, selects ranges, moves or changes the size of windows, etc. The execution-flow-creation aiding apparatus 101 may omit, for example, the display 207, the keyboard 208, and/or the mouse 209 among the components above.

An example of a written operation procedure M will be described. The written operation procedure M, for example, corresponds to the written operation procedure 110 depicted in FIG. 1.

Figure 3:
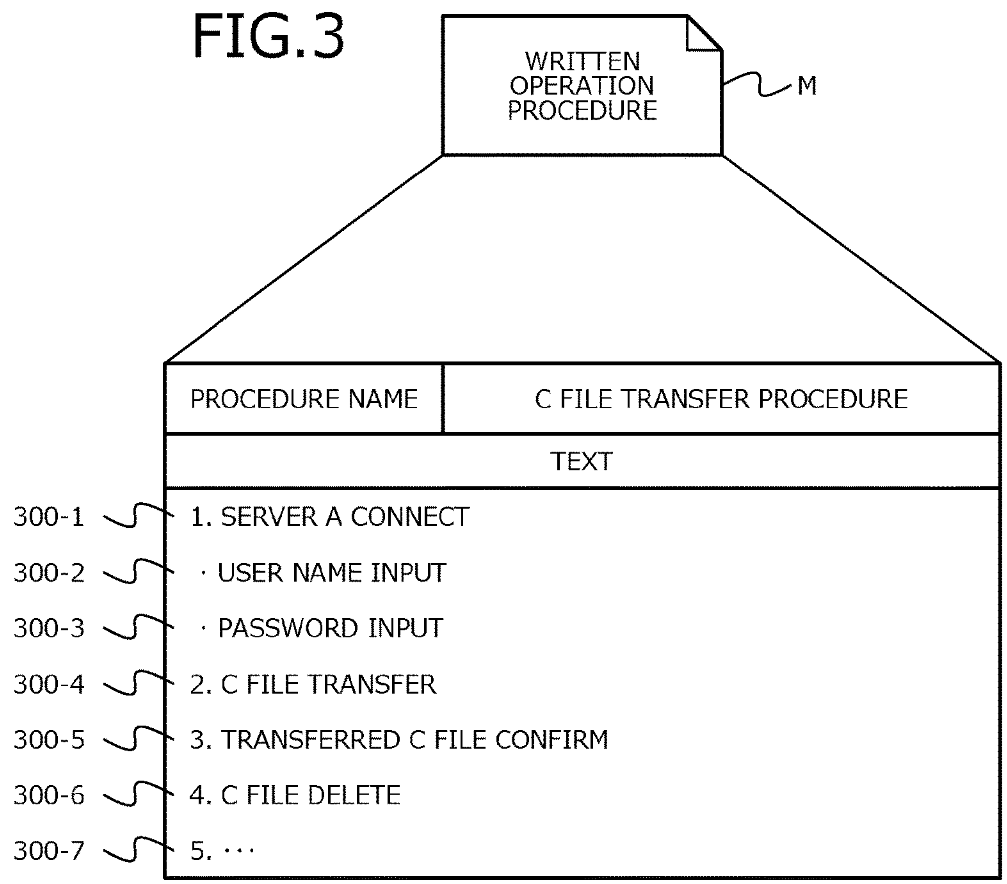
FIG. 3 is a diagram depicting an example of a written operation procedure M.

FIG. 3 is a diagram depicting an example of the written operation procedure M. In FIG. 3, the written operation procedure M is information indicating an operation procedure of a series of tasks involved in operation work of the procedure name "C file transfer procedure". More specifically, text 300-1 to 300-7 indicating task details of tasks involved in operation work are described in task sequence, in the written operation procedure M.

For example, text 300-1 indicates operator task details of "server A connect". Text 300-2 indicates operator task details of "user name input". Further, text 300-3 indicates operator task details of "password input".

The contents of an automated execution component database (DB) 400 used by the execution-flow-creation aiding apparatus 101 will be described. The automated execution component DB 400, for example, is stored in a storage apparatus such as the ROM 202, the RAM 203, and the magnetic disk 205 depicted in FIG. 2. The automated execution component DB 400, for example, corresponds to the component information 120 depicted in FIG. 1.

Figure 4:
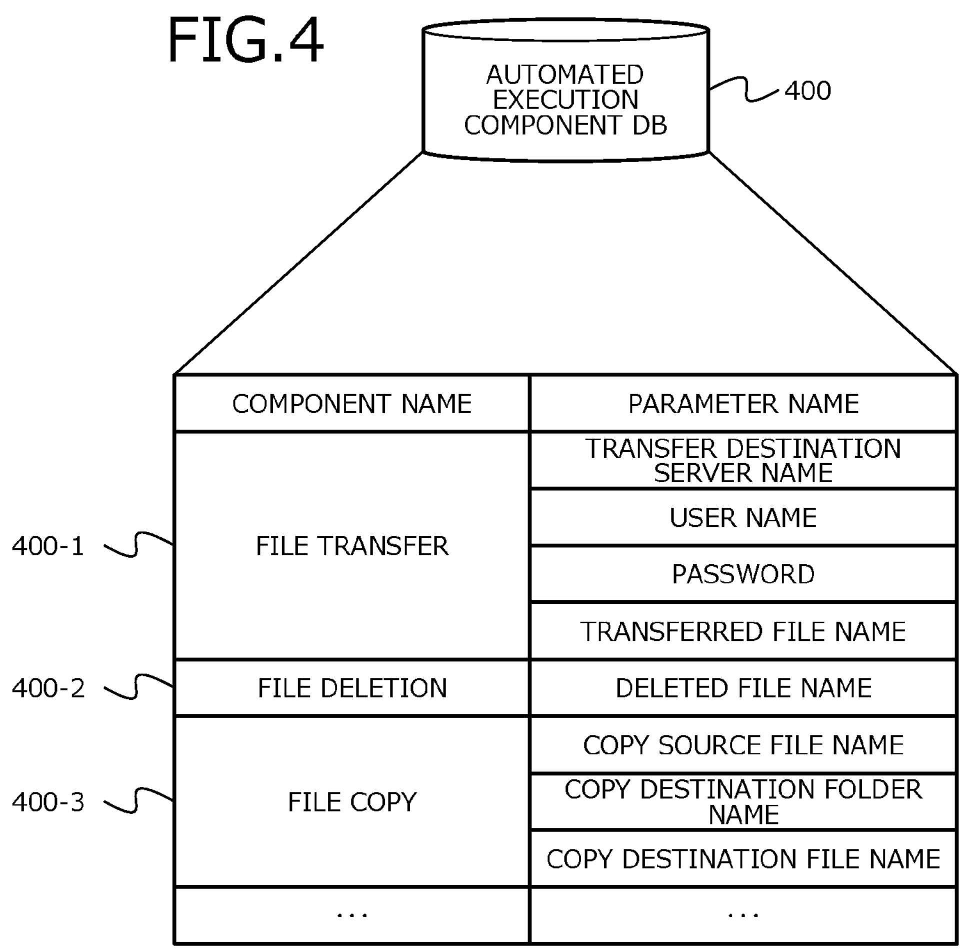
FIG. 4 is a diagram depicting an example of the contents of an automated execution component DB 400.

FIG. 4 is a diagram depicting an example of the contents of the automated execution component DB 400. In FIG. 4, the automated execution component DB 400 has fields for component names and parameter names, and by setting information into the fields, component information (e.g., component information 400-1 to 400-3) is stored for each component of the automation tool.

Here, a component name is the name of a component for automatically executing a portion of or all tasks involved in operation work. A parameter name is the name of a parameter provided when the component is executed. For example, component information 400-1 indicates parameter names "transfer destination server name", "user name", "password", and "transferred file name" for a component of the component name "file transfer".

The contents of a task name table 500 used by the execution-flow-creation aiding apparatus 101 will be described. The task name table 500, for example, is realized by a storage apparatus such as the RAM 203, the magnetic disk 205, etc. depicted in FIG. 2.

FIG. 5 is a diagram depicting an example of the contents of the task name table 500. In FIG. 5, the task name table 500 has fields for text and task names; and by setting information into the fields, extraction results 500-1 to 500-7 are stored as records.

Here, text is text included in the written operation procedure M. In this example, text (text 300-1 to 300-7 depicted in FIG. 3) included in the written operation procedure M of the procedure name "C file transfer procedure" is depicted. Further, a task name is the name of a task included in the written operation procedure M. In this example, task names are separated into objects and actions.

A task name object is a character string representing an object of a task. A task name action is a character string representing task details of a task. For example, extraction result 500-1 indicates a task name "(object) server A, (action) connect" extracted from text "server A connect" included in the written operation procedure M of the procedure name "C file transfer procedure".

The contents of an association list LT used by the execution-flow-creation aiding apparatus 101 will be described. The association list LT, for example, is realized by a storage apparatus such as the RAM 203, the magnetic disk 205, etc. depicted in FIG. 2.

FIG. 6 is a diagram depicting an example of the contents of the association list LT. In FIG. 6, the association list LT has fields for text, task names, and associated component names; and by setting information into the fields, association results (e.g., association results 600-1 to 600-4) are stored.

Here, text is text included in the written operation procedure M. In the text field, text included in the written operation procedure M is set in the order of appearance. A task name is the name of a task included in the written operation procedure M. In this example, task names are separated into objects and actions. An associated component name is the name of a component associated with the task name.

For example, association result 600-1 indicates an associated component name "file transfer" associated with the task name "(object) C file, (action) transfer" extracted from text "transfer C file" included in the written operation procedure M of the procedure name "C file transfer procedure".

Figure 7:
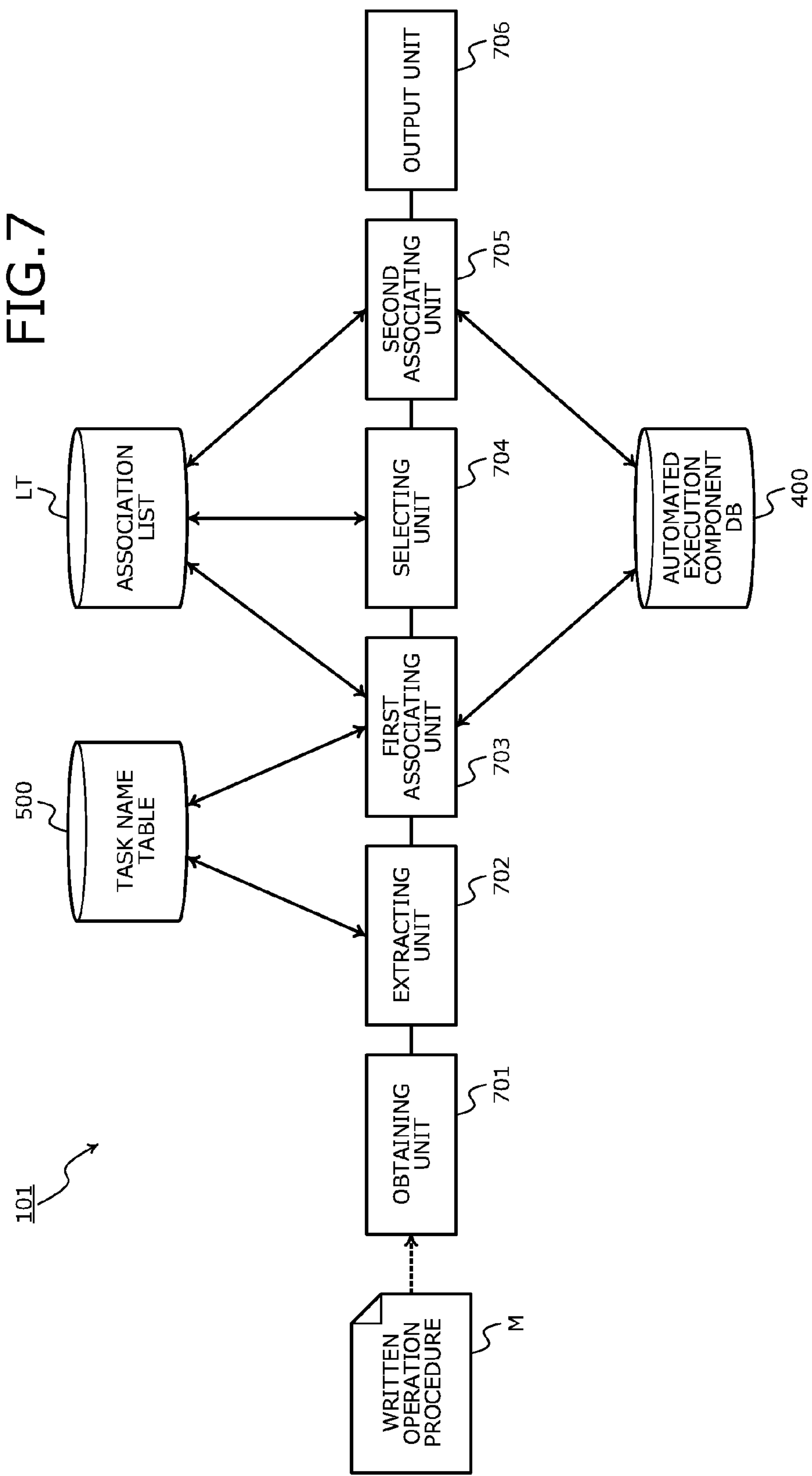
FIG. 7 is a block diagram of a functional configuration of the execution-flow-creation aiding apparatus 101.

FIG. 7 is a block diagram of a functional configuration of the execution-flow-creation aiding apparatus 101. In FIG. 7, the execution-flow-creation aiding apparatus 101 is configured to include an obtaining unit 701, an extracting unit 702, a first associating unit 703, a selecting unit 704, a second associating unit 705, and an output unit 706. More specifically, for example, functions of the functional units are realized by executing on the CPU 201, a program stored in a storage apparatus such as the ROM 202, the RAM 203, the magnetic disk 205, etc. depicted in FIG. 2 or by the I/F 206. Process results of the functional units are stored to a storage apparatus such as the RAM 203, the magnetic disk 205, etc. depicted in FIG. 2.

In the description hereinafter, a series of tasks involved in operation work is indicated as "the series of tasks OP1 to OPn" (n: natural number of 2 or more); and an arbitrary task among the series of tasks OP1 to OPn may be indicated as "task OPi" (i=1, 2, . . . , n). Further, components included in the automated execution component DB 400 are indicated as "components P1 to Pm" (m: natural number of 2 or more); and an arbitrary component among components P1 to Pm may be indicated as "component Pj" (j=1, 2, . . . , m).

The obtaining unit 701 has a function of obtaining the written operation procedure M, which represents an operation procedure of the series of tasks OP1 to OPn involved in operation work. More specifically, for example, the obtaining unit 701 obtains the written operation procedure M (refer to FIG. 3) by user input of a task via the keyboard 208 or the mouse 209 depicted in FIG. 2. Further, the obtaining unit 701, for example, may obtain the written operation procedure M from an external computer via the network 210.

The extracting unit 702 has a function of extracting from the obtained written operation procedure M, the task name of a task OPi included in the series of tasks OP1 to OPn. More specifically, for example, the extracting unit 702 performs morphological analysis and dependency parsing with respect to text (e.g., text 300-1 to 300-7 depicted in FIG. 3) included in the written operation procedure M. The extracting unit 702 extracts from the text, verbs as (actions) and nouns modified by the nouns as (objects) to thereby, extract the task name of the task OPi.

For instance, taking text 300-1 depicted in FIG. 3 as an example, the extracting unit 702 extracts from text 300-1, the verb "connect" as an (action) and the noun modified by the verb "server A" as an (object) to thereby, extract the task name "server A connect". Extraction results, for example, are stored to the task name table 500 depicted in FIG. 5.

The task name of each task OPi included in the series of tasks OP1 to OPn involved in operation work can be extracted from the written operation procedure M.

The first associating unit 703 has a function of referring to the automated execution component DB 400 (refer to FIG. 4) and associating a task OPi and a component Pj based on comparison results of the task names of tasks OPi included in the series of tasks OP1 to OPn and the component names of components Pj. More specifically, for example, the first associating unit 703 associates with a task OPi, a component Pj for which the degree of similarity R of the component name thereof and the task name of the task OPi is threshold α or greater and for which the degree of similarity R is greatest among components P1 to Pm.

Here, description of an example of associating a task OPi and a component Pj will be given taking the task name "C file transfer" and the component name "file transfer" as an example. Threshold α is arbitrarily set and stored in a storage apparatus such as the ROM 202, the RAM 203, and the magnetic disk 205.

The first associating unit 703 compares the task name "C file transfer" and the component name "file transfer" and determines whether character strings coincide. In this example, among the 13 characters of the task name "C file transfer", 12 characters "file transfer" coincide with the component name "file transfer". In this case, the first associating unit 703 calculates "R=12/13" as the degree of similarity R for the task name "C file transfer" and the component name "file transfer".

In this example, threshold α is assumed to be α=0.5, and the component for which the degree of similarity R of the component name thereof and the task name "C file transfer" is greatest among components P1 to Pm is assumed to be the component of the component name "file transfer". In this case, the degree of similarity R "12/13" is threshold α "0.5" or greater and therefore, the first associating unit 703 associates the component Pj of the component name "file transfer" with the task OPi of the task name "C file transfer".

Thus, among components P1 to Pm, the task OPi and the component Pj of the component name that is most similar to the task name of the task OPi can be associated. Association results, for example, are stored to the association list LT depicted in FIG. 6.

The selecting unit 704 has a function of selecting from among the series of tasks OP1 to OPn, a task OPk (k≠i, k=1, 2, . . . , n) that is the task before or after a task OPi associated with a component Pj and that is not associated with a component. More specifically, for example, the selecting unit 704 refers to the association list LT and selects the task name "password input", which is not associated with a component and is immediately before the task name "C file transfer" associated with the component name "file transfer".

The second associating unit 705 has a function of referring to the automated execution component DB 400 and associating a task OPk to a component Pj based on a comparison result of the task name of the selected task OPk and the parameter name of a parameter provided when a component Pj is executed.

More specifically, for example, when the degree of similarity R the object portion of the task name of a task OPk and the parameter name of a component Pj is greater than or equal to a threshold β, the second associating unit 705 associates the task OPk with the component Pj. Association results, for example, are stored in the association list LT depicted in FIG. 6. Threshold β is arbitrarily set and stored in a storage apparatus such as the ROM 202, the RAM 203, and the magnetic disk 205. Threshold β, for example, is β=0.5".

Thus, a task OPk such as that of inputting and setting a parameter value provided when a component Pj is executed or a task OPk such as that of taking a parameter value as an argument can be associated with the component Pj. Details of processing by the second associating unit 705 will be described with reference to FIGS. 8 and 9.

Further, when a task count associated with a component Pj is less than or equal to a threshold γ, the selecting unit 704 may select a task OPk that is immediately before or after a task OPi associated with a component Pj and that is not assigned to a component. Here, threshold γ is an upper limit of the task count of the tasks OPi associated with a component Pj. Threshold γ is, for example, arbitrarily set and stored in a storage apparatus such as the ROM 202, the RAM 203, and the magnetic disk 205.

The selecting unit 704 may further calculate threshold γ based on a count of parameters provided when the component Pj is executed. More specifically, for example, the selecting unit 704 calculates a value that is about twice the count of parameters provided when the component Pj is executed. As a result, if the association by the first associating unit 703 is not suitable, errant association of a component Pj and a task OPk can be suppressed.

Further, the second associating unit 705 may create based on association results, an execution flow representing an execution sequence of one or more components Pj that execute the series of tasks OP1 to OPn. More specifically, for example, the second associating unit 705 refers to the association list LT and creates an execution flow by converting the series of tasks OP1 to OPn into components of the automation tool.

The output unit 706 has a function of outputting association results. More specifically, for example, as depicted in state (8D) of FIG. 9, configuration may be such that the association list LT is output. Thus, the association list LT, which indicates associations of the task names of operator tasks OPi in the written operation procedure M and component names of components Pj in the automation tool can be output.

Further, the output unit 706 may output the execution flow. Thus, an execution flow for a case where operation is automatically executed by the automation tool can be output. The form of output by the output unit 706 may be, for example, storage to a storage apparatus such as the RAM 203 and the magnetic disk 205, display on the display 207, print out by a non-depicted printer, and transmission to an external computer via the I/F 206.

Details of the processing by the second associating unit 705 will be described with reference to FIGS. 8 and 9.

FIGS. 8 and 9 are diagrams depicting a transition example of the contents of the association list LT. In state (8A) depicted in FIG. 8, the task name "password input" for which an associated component name has not been set and that is immediately before the task name "C file transfer" associated with the associated component name "file transfer" is assumed to be selected as the task name of task OPk.

In this case, the second associating unit 705 refers to the automated execution component DB 400 and selects the parameter name of a parameter that is given when the component of the associated component name "file transfer" is executed. In this example, the parameter name "password" of the parameter corresponding to the associated component name "file transfer" is assumed to be selected.

The second associating unit 705 compares the object portion "password" of the task name "password input" and the parameter name "password", and determines whether character strings coincide. In this example, the object portion "password" and the parameter name "password" completely coincide. In this case, the second associating unit 705 calculates "R=1" as the degree of similarity R of the object portion "password" of the task name "password input" and the parameter name "password".

The second associating unit 705 associates the task name "password input" with the associated component name "file transfer", if the degree of similarity R is greater than or equal to threshold β. In this example, threshold β is assumed to be "β=0.5". In this case, since the degree of similarity R is greater than or equal to threshold β, the second associating unit 705 associates the task name "password input" with the associated component name "file transfer".

The second associating unit 705 sets the associated component name "file transfer" into the associated component name field for the task name "password input" in the association list LT (refer to state (8B) in FIG. 8). Thus, a task OPk such as that of inputting a parameter of a component Pj can be associated with the component Pj.

In state (8B) depicted in FIG. 8, the task name "user name input" for which an associated component name has not been set and that is immediately before the task name "password input" associated with the associated component name "file transfer" is assumed to be selected as the task name of a task OPk.

In this case, the second associating unit 705 refers to the automated execution component DB 400 and selects the parameter name of a parameter provided when the component of the associated component name "file transfer" is executed. In this example, the parameter name "user name" of the associated component name "file transfer" is assumed to be selected.

The second associating unit 705 compares the object portion "user name" of the task name "user name input" and the parameter name "user name" and determines whether character strings coincide. In this example, the object portion "user name" and the parameter name "user name" completely coincide. In this case, the second associating unit 705 calculates "R=1" as the degree of similarity R of the object portion "user name" of the task name "user name input" and the parameter name "user name". The second associating unit 705 associates the task name "user name input" with the associated component name "file transfer", if the degree of similarity R is greater than or equal to threshold β. In this example, since the degree of similarity R is greater than or equal to threshold β, the second associating unit 705 associates the task name "user name input" with the associated component name "file transfer".

The second associating unit 705 sets the associated component name "file transfer" into the associated component name field corresponding to the task name "user name input" in the association list LT (refer to (8C) in FIG. 9). Thus, a task OPk such as that of inputting a parameter of a component Pj can be associated with the component Pj.

In state (8C) depicted in FIG. 9, the task name "server A connect" for which an associated component name has not been set and that is immediately before the task name "user name input" associated with the associated component name "file transfer" is assumed to be selected as the task name of a task OPk.

In this case, the second associating unit 705 refers to the automated execution component DB 400 and selects the parameter name of a parameter provided when the component of the associated component name "file transfer" is executed. In this example, the parameter name "transfer destination server name" of a parameter for the associated component name "file transfer" is assumed to be selected.

The second associating unit 705 compares the object portion "server A" of the task name "server A connect" and the parameter name "transfer destination server name". In this case, 6 characters "server" of the 7 characters of the object portion "server A" coincide with the parameter name "transfer destination server name". In this case, the second associating unit 705 calculates "R=6/7" as the degree of similarity R of the object portion "server A" of the task name "server A connect" and the parameter name "transfer destination server name".

The second associating unit 705 associates the task name "server A connect" with the associated component name "file transfer", if the degree of similarity R is greater than or equal to threshold β. In this example, since the degree of similarity R is greater than or equal to threshold β, the second associating unit 705 associates the task name "server A connect" with the associated component name "file transfer".

The second associating unit 705 sets the associated component name "file transfer" into the associated component name field corresponding to the task name "server A connect" in the association list LT (refer to state (8D) in FIG. 9). Thus, a task OPk such as that of setting a parameter of a component Pj can be associated with the component Pj.

A procedure of the execution-flow-creation aiding process of the execution-flow-creation aiding apparatus 101 will be described.

Figure 10:
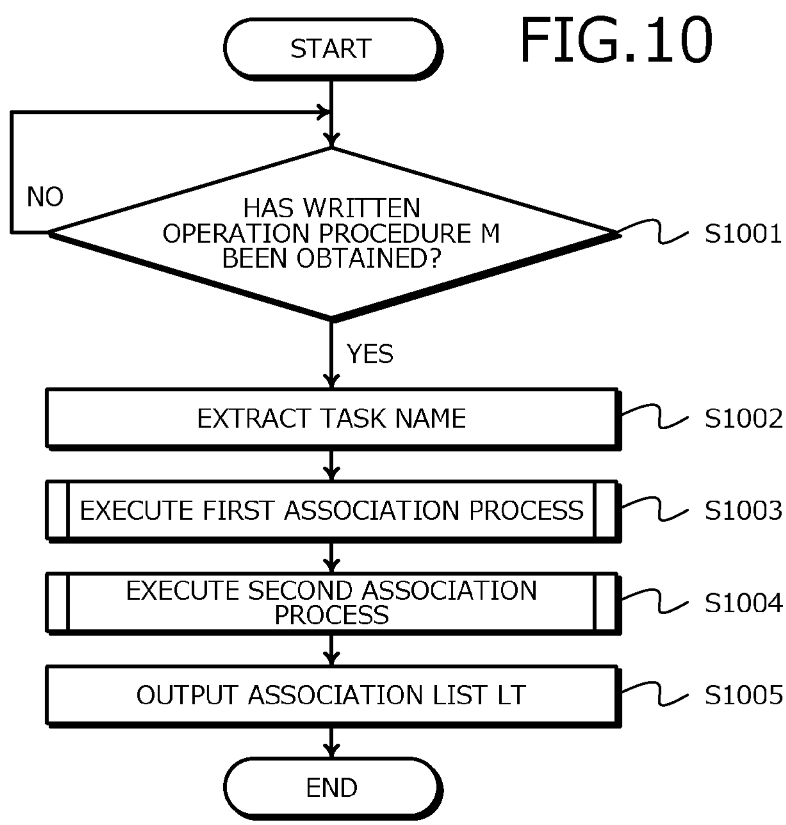
FIG. 10 is a flowchart depicting an example of a procedure of an execution-flow-creation aiding process of the execution-flow-creation aiding apparatus 101.

FIG. 10 is a flowchart depicting an example of the procedure of the execution-flow-creation aiding process of the execution-flow-creation aiding apparatus 101. As depicted in the flowchart in FIG. 10, the execution-flow-creation aiding apparatus 101 determines whether the written operation procedure M has been obtained (step S1001). Here, the execution-flow-creation aiding apparatus 101 waits until the written operation procedure M has been obtained (step S1001: NO).

When the written operation procedure M has been obtained (step S1001: YES), the execution-flow-creation aiding apparatus 101 extracts from the written operation procedure M, the task name of a task OPi included in the series of tasks OP1 to OPn (step S1002). The extraction result is stored to the task name table 500.

The execution-flow-creation aiding apparatus 101 executes a first association process (step S1003). The first association process is a process of comparing the task name of a task OPi and the component name of a component Pj to associate the task OPi and the component Pj. A detailed procedure of the first association process will be described with reference to FIG. 11.

The execution-flow-creation aiding apparatus 101 executes a second association process (step S1004). The second association process is a process of comparing the task name of a task OPk and the parameter name of a parameter provided when the component Pj is executed, to associate the task OPk with the component Pj. A detailed procedure of the second association process will be described with reference to FIGS. 12 and 13.

The execution-flow-creation aiding apparatus 101 outputs the association list LT (step S1005), ending a series of operations according to the flowchart. Thus, the association list LT indicating associations of the task names of operator tasks OPi included in the written operation procedure M and the component names of components Pj of the automation tool can be output.

A detailed procedure of the first association process at step S1003 depicted in FIG. 10 will be described.

FIG. 11 is a flowchart of an example of a detailed procedure of the first association process. In the flowchart depicted in FIG. 11, the execution-flow-creation aiding apparatus 101 selects from the task name table 500, a task name of a task OPi (step S1101).

The execution-flow-creation aiding apparatus 101 selects from the automated execution component DB 400, a component name of a component Pj (step S1102). The execution-flow-creation aiding apparatus 101 calculates the degree of similarity R of the task name of the task OPi and the component name of the component Pj (step S1103).

The execution-flow-creation aiding apparatus 101 determines if the calculated degree of similarity R is greater than or equal to the degree of similarity R in a buffer (step S1104). The buffer, for example, is realized by a storage apparatus such as the RAM 203 and the magnetic disk 205.

If the calculated degree of similarity is less than the degree of similarity R in the buffer (step S1104: NO), the execution-flow-creation aiding apparatus 101 transitions to step S1106. On the other hand, if the calculated degree of similarity is greater than or equal to the degree of similarity R in the buffer (step S1104: YES), the execution-flow-creation aiding apparatus 101 registers the component name of the component Pj and the degree of similarity R into the buffer (step S1105).

The execution-flow-creation aiding apparatus 101 determines whether a component name that has yet to be selected from the automated execution component DB 400 is present (step S1106). If a non-selected component name is present (step S1106: YES), the execution-flow-creation aiding apparatus 101 returns to step S1102 and selects from the automated execution component DB 400, a component name of a component Pj that has yet to be selected.

On the other hand, if no non-selected component name is present (step S1106: NO), the execution-flow-creation aiding apparatus 101 determines if the degree of similarity R in the buffer is greater than or equal to threshold α (step S1107). Here, if the degree of similarity R in the buffer is less than threshold α (step S1107: NO), the execution-flow-creation aiding apparatus 101 transitions to step S1109.

On the other hand, if the degree of similarity R in the buffer is greater than or equal to threshold α (step S1107: YES), the execution-flow-creation aiding apparatus 101 associates the task name of the task OPi and the component name of the component Pj (step S1108). The association result is stored to the association list LT.

The execution-flow-creation aiding apparatus 101 clears the buffer (step S1109) and determines whether a task name that has yet to be selected from the task name table 500 is present (step S1110). If a non-selected task name is present (step S1110: YES), the execution-flow-creation aiding apparatus 101 returns to step S1101 and selects from the task name table 500, a task name of a task OPi that has yet to be selected.

On the other hand, if no non-selected task name is present (step S1110: NO), the execution-flow-creation aiding apparatus 101 ends a series of operations according to the flowchart and returns to the step at which the first association process is called. Thus, among components P1 to Pm, a component Pj of a component name that is most similar to the task name of a task OPi and the task OPi can be associated.

A detailed procedure of the second association process at step S1004 in FIG. 10 will be described. In the description hereinafter, in the association list LT, a task name for which an associated component name has been set may be indicated as a "component-associated task name" and a task name for which no associated component name has been set may be indicated as a "non-component-associated task name".

FIGS. 12 and 13 are flowcharts depicting an example of a detailed procedure of the second association process. In the flowchart depicted in FIG. 12, the execution-flow-creation aiding apparatus 101 selects from the association list LT, a component-associated task name X (step S1201). The execution-flow-creation aiding apparatus 101 determines whether, in the association list LT, a non-component-associated task name is present between the selected component-associated task name X and a component-associated task name Y that is immediately therebefore (step S1202).

If a non-component-associated task name is present (step S1202: YES), the execution-flow-creation aiding apparatus 101 selects from the association list LT, the non-component-associated task name A that is immediately before the component-associated task name X (step S1203). The execution-flow-creation aiding apparatus 101 refers to the automated execution component DB 400 and selects a parameter name corresponding to the associated component name P of the component-associated task name X (step S1204).

The execution-flow-creation aiding apparatus 101 calculates the degree of similarity R of the object portion of the non-component-associated task name A and the parameter name (step S1205). The execution-flow-creation aiding apparatus 101 determines if the calculated degree of similarity R is greater than or equal to threshold β (step S1206).

If the degree of similarity R is less than threshold β (step S1206: NO), the execution-flow-creation aiding apparatus 101 determines whether a non-selected parameter name corresponding to the component name associated with the component-associated task name X is present (step S1207).

If a non-selected parameter name is present (step S1207: YES), the execution-flow-creation aiding apparatus 101 returns to step S1204 and selects a non-selected parameter name corresponding to the associated component name P of the component-associated task name X. On the other hand, if no non-selected parameter name is present (step S1207: NO), the execution-flow-creation aiding apparatus 101 transitions to step S1301 depicted in FIG. 13.

At step S1206, if the degree of similarity R is greater than or equal to threshold β (step S1206: YES), the execution-flow-creation aiding apparatus 101 associates the non-component-associated task name A with the associated component name P (step S1208). The association result is stored to the association list LT.

The execution-flow-creation aiding apparatus 101 determines whether, in the association list LT, a non-component-associated task name is present between the non-component-associated task name A and the component-associated task name Y immediately therebefore (step S1209). If a non-component-associated task name is present (step S1209: YES), the execution-flow-creation aiding apparatus 101 returns to step S1203 and selects from the association list LT, the non-selected non-component-associated task name A that is immediately before the component-associated task name X.

On the other hand, if no non-component-associated task name is present (step S1209: NO), the execution-flow-creation aiding apparatus 101 transitions to step S1301 depicted in FIG. 13. Further, at step S1202, if no non-component-associated task name is present (step S1202: NO), the execution-flow-creation aiding apparatus 101 transitions to step S1301 depicted in FIG. 13.

In the flowchart depicted in FIG. 13, the execution-flow-creation aiding apparatus 101 determines whether, in the association list LT, a non-component-associated task name is present between the component-associated task name X and a component-associated task name Z that is immediately thereafter (step S1301). If no non-component-associated task name is present (step S1301: NO), the execution-flow-creation aiding apparatus 101 transitions to step S1309.

On the other hand, if a non-component-associated task name is present (step S1301: YES), the execution-flow-creation aiding apparatus 101 selects from the association list LT, the non-component-associated task name B that is immediately after the component-associated task name X (step S1302). The execution-flow-creation aiding apparatus 101 refers to the automated execution component DB 400 and selects a parameter name corresponding to the associated component name P of the component-associated task name X (step S1303).

The execution-flow-creation aiding apparatus 101 calculates the degree of similarity R of the object portion of the non-component-associated task name B and the parameter name (step S1304). The execution-flow-creation aiding apparatus 101 determines if the calculated degree of similarity R is greater than or equal to threshold β (step S1305).

If the degree of similarity R is less than threshold β (step S1305: NO), the execution-flow-creation aiding apparatus 101 determines whether a non-selected parameter name corresponding to the associated component name of the component-associated task name X is present (step S1306).

If a non-selected parameter name is present (step S1306: YES), the execution-flow-creation aiding apparatus 101 returns to step S1303 and selects a non-selected parameter name corresponding to the associated component name P of the component-associated task name X. On the other hand, if no non-selected parameter name is present (step S1306: NO), the execution-flow-creation aiding apparatus 101 transitions to step S1309.

At step S1305, if the degree of similarity R is greater than or equal to threshold β (step S1305: YES), the execution-flow-creation aiding apparatus 101 associates the non-component-associated task name B with the associated component name P (step S1307). The association result is stored to the association list LT.

The execution-flow-creation aiding apparatus 101 determines whether, in the association list LT, a non-component-associated task name is present between the non-component-associated task name B and the component-associated task name Z immediately thereafter (step S1308). If a non-component-associated task name is present (step S1308: YES), the execution-flow-creation aiding apparatus 101 returns to step S1302 and selects from the association list LT, a non-selected non-component-associated task name B immediately after the component-associated task name X.

On the other hand, if no non-component-associated task name is present (step S1308: NO), the execution-flow-creation aiding apparatus 101 determines whether a non-selected component-associated task name that has yet to be selected from the association list LT is present (step S1309). If a non-selected, component-associated task name is present (step S1309: YES), the execution-flow-creation aiding apparatus 101 returns to step S1201 depicted in FIG. 12 and selects from the association list LT, a non-selected, component-associated task name X.

On the other hand, if no non-selected component-associated task name is present (step S1309: NO), the execution-flow-creation aiding apparatus 101 ends a series of the operations according to the flowchart and returns to the step at which the second association process is called. Thus, a task OPk such as that of inputting and setting a parameter value provided when a component Pj is executed or a task OPk such as that of taking a parameter value as an argument can be associated with the component Pj.

At step S1202 depicted in FIG. 12, if no component-associated task name Y immediately before the component-associated task name X is present, the execution-flow-creation aiding apparatus 101 determines whether a non-component-associated task name is present between the head of the association list LT and the component-associated task name X. Further, at step S1301 depicted in FIG. 13, if no component-associated task name Z immediately after the component-associated task name X is present, the execution-flow-creation aiding apparatus 101 determines whether a non-component-associated task name is present between the end of the association list LT and the component-associated task name X.

As described, the execution-flow-creation aiding apparatus 101 can extract verbs from text as (actions) and nouns modified by verbs as (objects), by performing morphological analysis and dependency parsing with respect to text included in the written operation procedure M. Thus, the task names of tasks OPi included in the series of tasks OP1 to OPn involved in operation work can be extracted from the written operation procedure M.

Further, the execution-flow-creation aiding apparatus 101 can associate tasks OPi and components Pj by referring to the automated execution component DB 400 and comparing the task names of tasks OPi included in the series of tasks OP1 to OPn and the component names of components Pj. More specifically, for example, the execution-flow-creation aiding apparatus 101 enables a component Pj for which the degree of similarity R of the component name thereof and the task name of a task OPi is threshold α or greater and for which the degree of similarity R is greatest among components P1 to Pm, to be associated with the task OPi. Thus, a task OPi and a component Pj of a component name that among components P1 to Pm, is most similar to the task name of the task OPi can be associated.

Further, the execution-flow-creation aiding apparatus 101 refers to the association list LT and from among the series of tasks OP1 to OPn, can select a task OPk that has not be associated with a component and that is immediately before or after a task OPi that is associated with a component Pj. As a result, in the written operation procedure M, a task OPk described near a task OPi associated with a component Pj can be narrowed down as a task candidate associated with the component Pj.

The execution-flow-creation aiding apparatus 101 further refers to the automated execution component DB 400 and compares the task name of the selected task OPk and the parameter name of a parameter provided when a component Pj is executed and thereby, can associated the task OPk with the component Pj. More specifically, for example, the execution-flow-creation aiding apparatus 101 enables association of the task OPk with the component Pj when the degree of similarity R of the task name of the task OPk and the parameter name for the component Pj is greater than or equal to threshold β. As a result, a task OPk such as that of inputting or setting a parameter value provided when a component Pj is executed or a task OPk such as that taking the parameter value as an argument can be associated with component Pj.

The execution-flow-creation aiding apparatus 101 enables a task OPk that is not associated with a component and that is immediately before or after a task OPi that is associated with a component Pj to be selected, when a task count for the component Pj is less than or equal to threshold γ. As a result, errant association of a component Pj and a task OPk can be suppressed in cases where comparison of the task name and the component name do not lead to suitable task/component associations.

The execution-flow-creation aiding apparatus 101 can calculate threshold γ based on a count of parameters provided when a component Pj is executed. As a result, for each component Pj, an upper limit of the task count of the tasks OPi associated with the component Pj can be set.

The execution-flow-creation aiding apparatus 101 can create based on association results, an execution flow that represents an execution sequence of one or more components Pj that execute the series of tasks OP1 to OPn. As a result, an execution flow when operation work is automatically executed by an automation tool can be automatically created.

Thus, the execution-flow-creation aiding apparatus 101 can make task/component associations even when operator tasks in the written operation procedure 110 and components of the automation tool are associated in many-to-one associations. As result, the work load can be reduced when execution flow automating operation work is created from the written operation procedure 110.

The execution-flow-creation aiding method described in the present embodiment may be implemented by executing a prepared program on a computer such as a personal computer and a workstation. The execution-flow-creation aiding program is stored on a non-transitory, computer-readable recording medium such as a hard disk, a flexible disk, a CD-ROM, an MO, and a DVD, from which the execution-flow-creation aiding program is read out and executed by the computer. The execution-flow-creation aiding program may be distributed through a network such as the Internet.

According to one aspect of the embodiments, an effect is achieved in that creation of an execution flow that automates operation work can be aided.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory, computer-readable recording medium storing therein an execution-flow-creation aiding program that causes a computer to execute a process comprising:

referring to component information that for each component that is an automated execution component of an automation tool and that executes a portion of or all of a series of tasks involved in operation work, indicates associations of a component name of the component and a variable name of a variable provided when the component is executed, and based on a result of comparing a task name of a task included among the series of tasks and the component name of the component, associating the task and the component;

selecting among the series of tasks, a second task that is not associated with a component and that is immediately before or after a first task that is already associated with a given component;

referring to the component information and based on a result of comparing a task name of the selected second task and a variable name of a variable provided when the given component is executed, associating the second task with the given component and storing results of the associating into an association list;

creating an execution flow representing an execution sequence of components that execute the series of tasks by converting each task included among the series of tasks into a component associated thereto in the association list; and executing each component in the execution sequence of components to execute the series of tasks.

2. The computer-readable recording medium according to claim 1, wherein the associating of the second task with the given component includes associating the second task with the given component, when a degree of similarity of the task name of the second task and the variable name of the variable provided when the given component is executed is a threshold or greater.

3. The computer-readable recording medium according to claim 1, wherein the associating of the task and the component includes associating with the task, the component for which a degree of similarity of the component name and the task name of the task is a threshold or greater and for which the degree of similarity is greatest among a plurality of components included in the component information.

4. The computer-readable recording medium according to claim 1, the process further comprising calculating an upper limit count for tasks associated with the given component, the upper limit being calculated based on a total count of variables provided when the given component is executed, wherein the selecting includes selecting the second task, when a count of tasks corresponding to the given component is the upper limit count or less.

5. The computer-readable recording medium according to claim 1, the process further comprising:

obtaining a written operation procedure that represents an operation procedure of the series of tasks involved in the operation work; and extracting from the obtained written operation procedure, the task name of the second task included in the series of tasks, wherein the associating of the second task and the given component includes referring to the component information and associating the second task and the given component based on a result of comparing the extracted task name of the second task and the component name of the given component.

6. The computer-readable recording medium according to claim 1, wherein the process further includes repeatedly performing the selecting, associating, and updating until either no more second tasks are present for the given component or a total number of tasks associated with the given component reaches an upper limit.

7. The computer-readable recording medium according to claim 1, wherein each task name includes an object and an action and the object and the action for each task is obtained by performing morphological analysis and dependency parsing on text included in a written operation procedure that is included in the association list and that corresponds to the operation work.

8. The computer-readable recording medium according to claim 1, wherein the process further includes referring to the association list and creating an execution flow by converting the series of tasks included in the association list into components of the automation tool.

9. An execution-flow-creation aiding apparatus comprising:

a first associating circuitry configured to refer to component information that for each component that is an automated execution component of an automation tool and that executes a portion of or all of a series of tasks involved in operation work, indicates associations of a component name of the component and a variable name of a variable provided when the component is executed, and based on a result of comparing a task name of a task included among the series of tasks and the component name of the component, associate the task and the component;

a selecting circuitry configured to select among the series of tasks, a second task that is not associated with a component and that is immediately before or after a first task that is already associated with a given component;

a second associating circuitry configured to refer to the component information and based on a result of comparing a task name of the selected second task and a variable name of a variable provided when the given component is executed, associate the second task with the given component and store results of the associating into an association list;

a creation circuitry configured to create an execution flow representing an execution sequence of components that execute the series of tasks by converting each task included among the series of tasks into a component associated thereto in the association list; and an execution circuitry configured to execute each component in the execution sequence of components to execute the series of tasks.

10. The execution-flow-creation aiding apparatus according to claim 9, wherein the second associating circuitry associates the second task with the given component, when a degree of similarity of the task name of the second task and the variable name of the variable provided when the given component is executed is a threshold or greater.

11. The execution-flow-creation aiding apparatus according to claim 9, wherein the first associating circuitry associates with the task, the component for which a degree of similarity of the component name and the task name of the task is a threshold or greater and for which the degree of similarity is greatest among a plurality of components included in the component information.

12. The execution-flow-creation aiding apparatus according to claim 9, wherein the selecting circuitry calculates based on a total count of variables provided when the given component is executed, an upper limit count for tasks associated with the given component and selects the second task when a count of tasks corresponding to the given component is the upper limit count or less.

13. An execution-flow-creation aiding method comprising:

referring to component information that for each component that is an automated execution component of an automation tool and that executes a portion of or all of a series of tasks involved in operation work, indicates associations of a component name of the component and a variable name of a variable provided when the component is executed, and based on a result of comparing a task name of a task included among the series of tasks and the component name of the component, associating the task and the component;

selecting among the series of tasks, a second task that is not associated with a component and that is immediately before or after a first task that is already associated with a given component;

referring to the component information and based on a result of comparing a task name of the selected second task and a variable name of a variable provided when the given component is executed, associating the second task with the given component and storing results of the associating into an association list;

creating an execution flow representing an execution sequence of components that execute the series of tasks by converting each task included among the series of tasks into a component associated thereto in the association list; and executing each component in the execution sequence of components to execute the series of tasks, wherein the execution-flow-creation aiding method is executed by a computer.

14. The execution-flow-creation aiding method according to claim 13, wherein the associating of the second task with the given component includes associating the second task with the given component, when a degree of similarity of the task name of the second task and the variable name of the variable provided when the given component is executed is a threshold or greater.

15. The execution-flow-creation aiding method according to claim 13, wherein the associating of the task and the component includes associating with the task, the component for which a degree of similarity of the component name and the task name of the task is a threshold or greater and for which the degree of similarity is greatest among a plurality of components included in the component information.

16. The execution-flow-creation aiding method according to claim 13, further comprising calculating an upper limit count for tasks associated with the given component, the upper limit being calculated based on a total count of variables provided when the given component is executed, wherein the selecting includes selecting the second task, when a count of tasks corresponding to the given component is the upper limit count or less.

* * * * *